June 25, 1935. W. M. ANDERSON 2,005,880
TIRE SPREADER
Filed Feb. 1, 1934 2 Sheets-Sheet 1
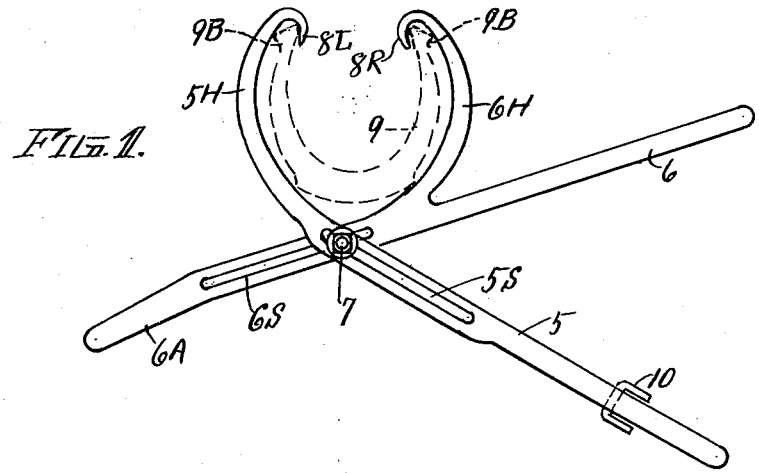
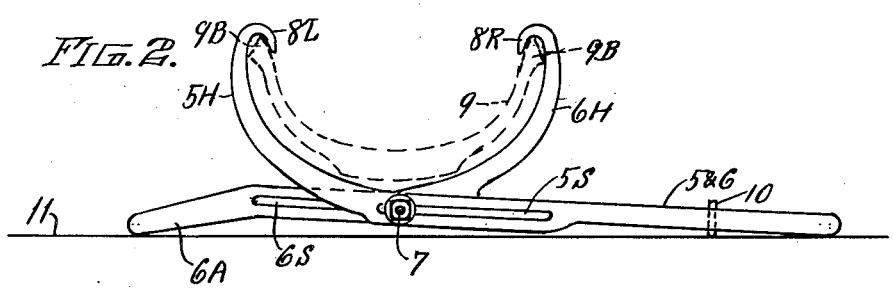
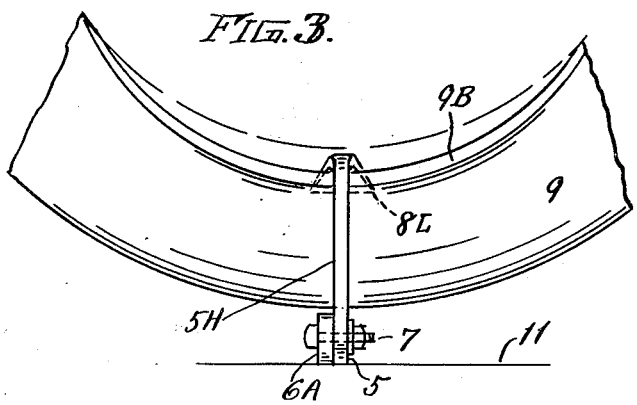
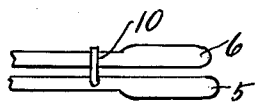
INVENTOR:
William M. Anderson
BY David E. Carlsen
ATTORNEY Patented June 25, 1935

2,005,880

UNITED STATES PATENT OFFICE 2,005,880

TIRE-SPREADER

William M. Anderson, Virginia, Minn.

Application February 1, 1934, Serial No. 709,322

6 Claims. (Cl. 152—27)

This invention relates to a spreader device for pneumatic tire casings, hereinafter designated simply as a tire spreader.

The main object is to provide a simple, highly efficient and inexpensive tire spreader adaptable for use on a large variety of sizes of tires, the construction being so simple that the tool is unobstructive, can be placed in tool boxes such as used on automobiles, for use on the road, and is also an invaluable tool for tire repair shops and garages.

Other objects and the advantages of my device are hereinafter fully set forth, reference being had to the accompanying drawings, in which,—

Fig. 1 is an elevation of my improved tire spreader in operative position engaging a tire in partially opened position, the tire shown in dotted lines only.

Fig. 2 is an elevation of my device engaging and holding a tire in fully spread position.

Fig. 3 is a left end elevation of Fig. 2 but showing the spread parts of the tire in full lines.

Fig. 4 is a top view of the two parallel lever parts as the right hand end parts of Fig. 2 and showing the handle locking means in operative position.

Figure 5:
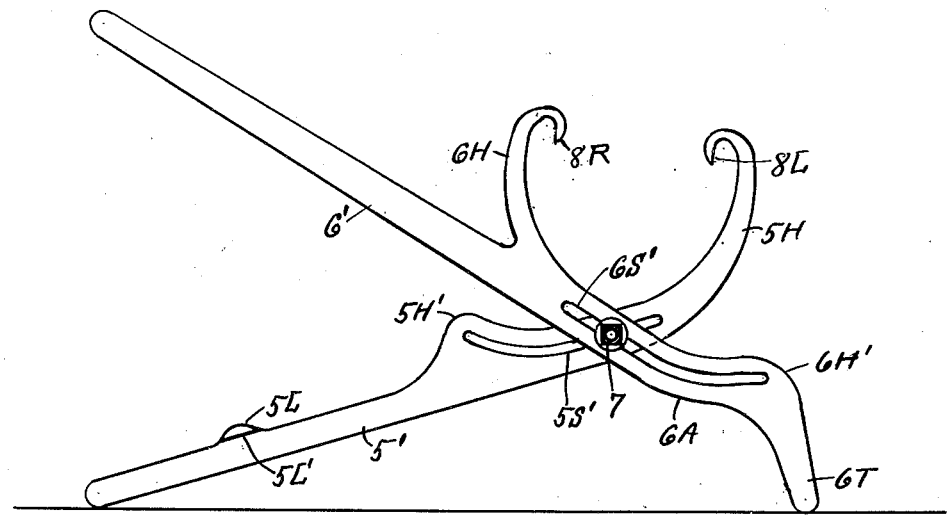
Fig. 5 is an enlarged view corresponding to Fig. 1 but viewed from the opposite side and embodying certain modifications.

Referring to the drawings by reference numerals, like numbers designating similar parts in the various views, the article will for descriptive purposes be assumed to be in a vertical position, as in Figs. 1 and 2. It comprises a pair of crossed levers 5 and 6, slidably and pivotally connected on suitable means such as a bolt 7 passed through slotted portions 6S and 5S of the levers 6 and 5 respectively.

Levers 5 and 6 are preferably of about the same length in one direction from the bolt, as to the right in Figs. 1 and 2, and to the left thereof lever 6 is continued as an arm 6A.

Above the pivotal connection lever 5 is continued as an integral hook 5H the upper parts of which are curved toward the right and terminates in a downwardly opening, preferably widened and flattened finger 8L.

On the upper side of lever 6 is formed, at the right of the pivot, another hook 6H, opposite hook 5H and of like proportions, being formed also at its upper extremity with a downwardly opening, widened and flattened finger 8R.

9 designates a pneumatic tire casing, shown in cross section in dotted lines only in Figs. 1 and 2, and in full lines in Fig. 3. Said casing has the usual beaded, integral, inner rim part 9B. The normal position of said bead, before spreading of a casing, is shown in dashed line in Fig. 3.

It will now be readily understood that by spreading the levers 5 and 6, as required according to size of the casing, the fingers 8R and 8L are hooked inwardly over and engaged with the casing beads. Subsequently, drawing the levers 5 and 6 toward each other the casing 9 will be spread for repairing, maximum necessary spreading being acquired when handles 5 and 6 are brought to position side by side, as in Figs. 2, 3 and 6.

In the latter position of the levers 5 and 6 they may be locked together by any suitable means, for example the simple U-shaped yoke 10, pivotally retained as in handle 5 and its arms adapted to be swung to a position in a plane at right angles to lever 5 to engage the adjacent lever 6 (see Fig. 4). Another suitable lock (see Figs. 5, 6 and 7) comprises merely an upward and sidewise directed integral lug 5L on the upper edge of one lever (as 5') and said lug formed with a lateral shoulder 5L' to engage the adjacent upper face of arm 6' when the arms are parallel (see Fig. 6).

11 in Figs. 2 and 3 designates the surface of a floor or work bench on which the device, when in operative position, has a three point contact, at the end of arm 6A and the two adjacent outer ends of levers 5 and 6 (see Figs. 2 and 4).

It will be readily understood that the pivot bolt 7 adjusts itself automatically according to size of tire to be spread as said bolt is slidable in the slots 5S and 6S.

Obviously with the device in the operative position as in Figs. 2 and 3, a casing is held in upright plane and access to the interior of the casing for repairs is facilitated.

Figure 6:
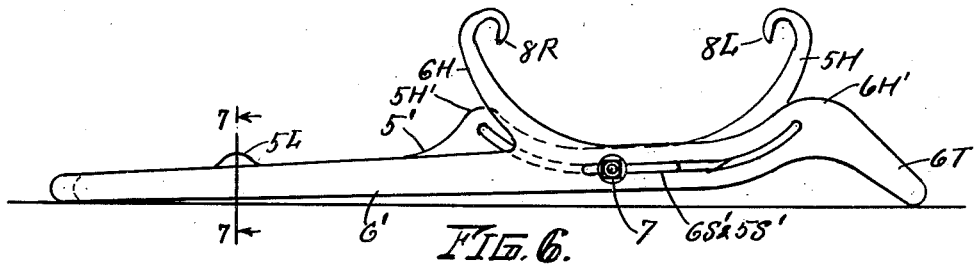
Fig. 6 is an elevation showing the modified device in spread position.
Figure 7:
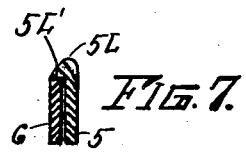
Fig. 7 is an enlarged cross sectional detail view as on line 7—7 in Fig. 6.

In Figs. 5 and 6 the modifications comprise the arm member 6' formed at its lower or front end with an integral angular terminus designated 6T and its slot 6S' lengthened forwardly in a curvature into the upper part of what may be termed the heel 6H' of said terminus. Likewise the corresponding slot 5S' is lengthened in the opposite direction and in an upward curvature in an enlargement 5H' of lever member 5'. This construction enables an operator to "overlap" the arms more than in the form of the device illustrated in Figs. 1 and 2, to engage and then spread the casing beads 9B of a comparatively large tire such as used on trucks or casings of so-called low pressure tires.

The preferred construction and use of my device have been fully disclosed. It might be added that its main use as a spreader also facilitates the removal of inner tubes from casings.

I claim:

1. A tire spreader comprising a pair of pivotally and slidably connected lever members, one member having an integral extension beyond said pivot and another integral part comprising an upwardly and rearwardly arched arm terminating in an inwardly and downwardly directed hook, the other lever comprising further an integral arm extension arched oppositely to the first described arm and terminating in a hook member similar to the hooked terminus of the first arm, said hook members adapted to simultaneously engage the opposite beads of a pneumatic tire casing and the arched arms to inclose casing to one side of the lever members with said pivot exteriorly of the casing.

2. The structure specified in claim 1 in which said arched arms are proportioned and positioned with relation to the respective levers, to engage the beads of a tire casing when the said levers are spread apart and to spread the casing when the said levers are brought into parallel relation to each other.

3. The structure specified in claim 1, in which said arched arms are proportioned and positioned with relation to the respective levers, to engage the beads of a tire casing when the said levers are spread apart and adapted to spread the casing when the said levers are brought into parallel relation to each other, and means for locking said levers together when in the latter position, said means comprising a member pivotally secured to one lever and adapted to swing into position to contact and retain the other lever.

4. A tire spreader comprising a pair of pivotally connected lever members each comprising a main lever arm formed straight rearwardly of the pivot, one member formed with an upward rearwardly curved hook forward of the pivot and the other member formed with a corresponding upward and forwardly curved hook rearward of the pivot, said latter member formed further with a forwardly and downwardly directed contact arm in angular relation to its main lever part, each member provided with an elongated slot, said slots intersecting, a pivot bolt passed through said slots and slidable therein.

5. The structure specified in claim 4, in which said slots of the members are extended in an upward curvature, one rearwardly of the pivot and the other forwardly of the pivot.

6. The structure specified in claim 1, in which said arched arms are proportioned and positioned with relation to the respective levers to engage the beads of a tire casing simultaneously when the said levers are spread, and to spread the casing when the said levers are brought into parallel relation, and means for locking said levers together in the latter position, said means comprising an integral lug on the upper edge of one arm and having a lateral face adapted to engage the upper adjacent edge portion of the other arm when the two lever arms are in parallel relation to each other.

WILLIAM M. ANDERSON.